US005614703A

United States Patent [19]

Martin et al.

[11] Patent Number: 5,614,703

[45] Date of Patent: Mar. 25, 1997

[54] HOTEL CHECK-IN SYSTEM WITH WIRELESS COMMUNICATION

[76] Inventors: Jay R. Martin; Scott E. Martin, both of 1735 Green Bay Rd., Highland Park, Ill. 60035

[21] Appl. No.: 524,543

[22] Filed: Sep. 7, 1995

Related U.S. Application Data

[63] Continuation-in-part of Ser. No. 369,173, Jan. 5, 1995, abandoned.

[51] Int. Cl.[6] .......... G06K 5/00

[52] U.S. Cl. .......... 235/382; 235/375; 235/382.5

[58] Field of Search .......... 235/375, 382, 235/382.5

[56] References Cited

U.S. PATENT DOCUMENTS

| | | | |
|---|---|---|---|
| 3,801,742 | 4/1974 | O'Brien et al. | 179/2 |
| 4,209,782 | 6/1980 | Donath et al. | 235/382.5 |
| 5,046,084 | 9/1991 | Barrett et al. | 235/382.5 |
| 5,089,692 | 2/1992 | Tonnesson | 235/382.5 |
| 5,146,217 | 9/1992 | Holmes et al. | 235/382.5 |

OTHER PUBLICATIONS

Conlon, Michael, "Your credit card may be your hotel room key someday," Minneapolis *Star Tribune*, Sep. 8, 1994.

Reuters, "Hotel industry unlocks door to high–technology security," Chicago *Tribune*, Sep. 11, 1994.

*Primary Examiner*—Harold Pitts
*Attorney, Agent, or Firm*—Moore & Hansen

[57] ABSTRACT

A method and apparatus for a guest having a valid general purpose credit card to register at a place of lodging having a computer, and which uses the general purpose credit card as a key to the assigned room. The method involves the inserting of a general purpose credit card into a card reader of a guest accessible registration terminal, the card reader reading the credit card information and delivering the information to a computer. The computer stores the card information, and the terminal, by means of registration software obtains further information from the guest, assigns the guest a room, and informs the guest of the room assignment, after which the credit card becomes a key to the guest room. When the credit card is inserted in the proper card reader at the assigned guest room door, the computer will actuate the lock and allow the guest access. The apparatus comprises a registration terminal accessible to a guest, the terminal having a terminal credit card reader, a keyboard, display screen, means to transmit guest and credit card information to the computer, and a plurality of remote general purpose credit card readers disposed at guest room entrances, each connected to the computer to actuate the door lock release apparatus at the assigned guest room when the guest credit card has been read by the guest room card reader and approved by the computer. Alternatively, wireless forms of communication such as commercially available pagers may be used so as to eliminate further expenses for modification and wiring.

4 Claims, 3 Drawing Sheets

HOTEL CHECK-IN SYSTEM WITH WIRELESS COMMUNICATION

This application is a continuation-in-part of application Ser. No. 08/369,173, filed Jan. 5, 1995, now abandoned.

BACKGROUND OF THE INVENTION

This invention relates to the field of guest registration systems for places of lodging, such as hotels, motels, boarding houses, rooming houses, bed-and-breakfasts, and the like. More specifically, it relates to an improved registration system which handles most check-in and departure situations without the need for a desk clerk.

In the lodging industry, and especially in the hotel and motel portions thereof, it has become commonplace to maintain computer records of guests and room availability. These records are constantly available to track the time that a guest stays at the place of lodging, the billing information for the guest, the room assignments and vacancies for the place of lodging, and other information. Such information is now usually entered manually by hotel employees. Most places of lodging utilize a front desk manned by an employee and at which registration information is obtained, a mode of payment is arranged and room keys are dispensed and collected. All these somewhat routine but personal tasks require most hotels and motels to staff their front desks 24 hours a day.

For some large hotel and motel chains, sufficient personnel time is available to staff the front desk at all times, to process arriving and departing guests, and to give out and collect room keys. However, small hotels and motels, including even the smaller or regional chains, and particularly individual or family owned units, often do not have the personnel or the resources to staff a front desk at all times. In many situations, the only staff at the smaller establishments is the proprietor or the immediate family of the proprietor, because limited operating budgets may be more wisely spent in activities other than staffing a front desk during inactive shifts. This smaller personnel base often means that guests arriving at off hours must ring a bell or buzzer for assistance, waking the manager or proprietor. Even large hotels, although able to staff the front desk at all times, may also have better ways of using operating dollars as opposed to constant staffing of the desk.

A major reason for needing a manned front desk has been the need to dispense and collect room keys. In recent years, the room key has evolved from the easily misplaced or duplicated metal key, to plastic hole-encoded punch cards, and then to plastic magnetically encoded room key cards proprietary to the hotel or motel and dispensed from the front desk. The latter key cards are useable only at the place of lodging and operate by the use of a magnetic card reader at the door of a guest room to actuate the guest room door lock after the card has been recognized and approved.

Hotel room key security is an ongoing problem when conventional keys and key cards are used. While a guest has some concerns about loss of his room key, it is seldom given the same level of concern as would be assigned to the guest's personal keys, wallet or the like. The guest's level of concern also varies with his perceived risk as, for example, a guest being fairly unconcerned with key security before he has physically placed his property in the guest room or after he has removed the property. Guests may even voluntarily allow others to use their hotel key, resulting in a still lower standard of security. The guest seldom realizes that each time the key is lost or available to unauthorized persons, that room security is jeopardized in some way, such as the room's equipment being vulnerable to damage, theft or other intrusion. Because of these attitudes hotel guest room key problems are substantially greater and more numerous than those encountered for a private residence. The present invention provides a workable solution to these difficulties.

With these shortcomings in mind there remains a need for a guest registration system which can successfully receive and also discharge the guest and address the problem of delivery and collection of a room key when employees are not available to assist the guest.

SUMMARY OF THE INVENTION

The present invention is a guest registration system well suited for both small hotels including those operated by one or two people and for large hotel and motel chains and substantially eliminates the need for continuous front desk registration work. The invention allows the manager or proprietor of a hotel to be away from the front desk to perform other activities, such as cleaning, laundry, maintenance, personal activities, or sleep. At the same time, the invention affords the manager or proprietor the knowledge that guests arriving during his absence will still be able to register at the place of lodging, receive a room and key, and check in quickly and efficiently.

The invention utilizes a registration terminal placed in an area accessible to a potential guest. The terminal utilizes a general purpose credit card reader, display screen, keypad and printer for preparing a summary of the room assignment and a receipt for the guest. The prospective guest inserts a general purpose credit card through the card reader. The card reader obtains card identity information from the card, and delivers the information to a computer provided with guest registration software for directing the computer. Using the software, the information from the card is verified by its issuing credit card service company, in known fashion, to determine the validity and spending limits of the credit card.

The computer maintains information about the status of vacancies and types of rooms available at the place of lodging. The computer software sends a series of prompts to the user via the display screen, asking for additional guest data. This data may include such information as whether the user has preregistered, what type of room is desired such as a single room or a double room, the expected length of the stay, the smoking preference and possible use of a personal identification number. Once the preferences have been entered, the guest registration system will assign the guest an available room, inform the guest of the charges based on the type of room selected and the expected length of the stay, store the credit card identity information, inform the guest that the credit card is a key for the assigned room and print and dispense a written receipt and instruction describing the room assignment.

A guest room credit card reader is positioned at each guest room door. When the guest runs the proper credit card through his guest room card reader, a door lock release apparatus at the guest room door will open the lock, allowing the guest into the room. Further, the guest's credit card can be authorized to open the locks on various other areas of the place of lodging.

In some instances, particularly when installation will be made in an already built and operating hotel, it is deskrable to avoid or minimize the installation of control wiring within a finished and decorated guest room or cutting into walls, doors, or carpets to place wires. The invention may be installed in such environments by using wireless communication means to transfer information between the computer and the guest room card reader so as to actuate the door lock release apparatuses of the present invention. Such wireless communication means reduces installation time and costs as well as minimizing the amount of required remodeling in an existing place of lodging.

Accordingly, the present invention can include a guest room wireless transmitter positioned in or adjacent a guest room, and additionally a guest room door wireless receiver positioned at or near the guest room card reader and connected by electrical wiring to the card reader. The guest room transmitter may be connected to the computer utilizing any part of the existing electrical wiring system serving the room, including television cable, intercom, telephone wiring, or standard electric service lines. Wireless communication between this transmitter and receiver results in credit card identity information being delivered by wireless signal to the guest room card reader and will thus allow the card reader to be programmed by wireless transmission to recognize a specific credit card as a guest room door key. In some situations the guest room transmitter may be replaced by a master transmitter which serves the entire hotel, with its signals being transmittable to all the guest rooms to reach each individual guest room receiver so as to program the guest room card reader connected with that receiver to accept a specific credit card.

It is also contemplated that the described receiver at the guest room card reader will at times be a transceiver positioned at the guest room door and capable of both receiving and transmitting wireless information signals. Some guest room card readers will only read the guest card identity information as the card is inserted and will not retain the information in memory. With such readers, a door transceiver may be utilized to receive the card identity information by wire from the guest room card reader and to then transmit the card identity information to a guest room transceiver positioned in or near the guest room or to a master transceiver serving the entire hotel. The room or master transceiver, on receiving the card identity information will relay that information by hard wired connections to the hotel computer, informing the computer of the card seeking access to the specific guest room. If the computer recognizes and accepts that guest card as an approved key the computer generates a signal which is sent via hard wired circuit to the room transceiver or master transmitter. The room transceiver or master transmitter responds by transmitting a wireless signal to the door transceiver. The door transceiver on receipt of this signal conveys the signal over wires to the guest room card reader, causing the lock to open to an approved card.

Use of such wireless communication means eliminates the need to place new wiring into the guest room walls and doors of an existing building. Further, the actual guest room receiver which receives a wireless control signal may be located inside the guest room near the guest room door or even within the guest room card reader located at or on the guest room door, lowering the possibility of system corruption from points external to guest rooms. Acceptable wireless communication means include infrared emitters and receivers, sound wave transmitters and receivers, radio frequency transmitters and receivers, and commercially available pager systems.

These and other benefits of the present invention will become apparent from the following detailed description thereof taken in conjunction with the accompanying drawings.

DETAILED DESCRIPTION

Figure 1:
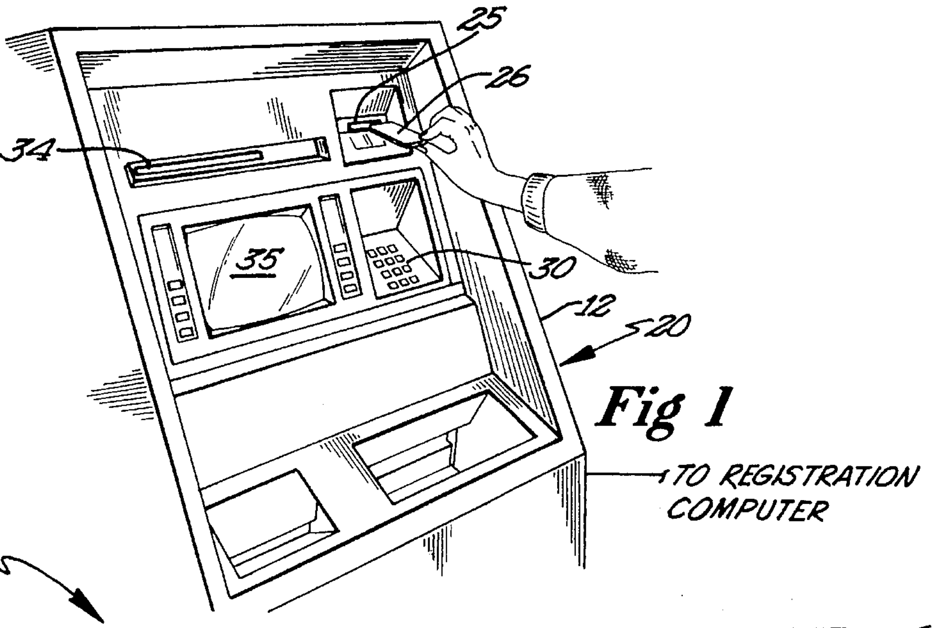
FIG. 1 is a perspective view of a typical registration terminal embodying the invention.

Referring now to the drawings, the guest registration system 10 includes a registration terminal 20 having a terminal credit card reader 25, a data input means such as alpha-numeric keypad 30, and a data conveying means for delivering information to a guest, such as display screen 35 and printer 34 which provides receipts and room instructions. Although the keypad 30 and display screen 35 are the preferred data input and conveying means to be used in the registration terminal 20, any devices or systems currently in use, or to be developed in the future, by which communication can be effectively completed are within the purview of the invention. Such alternatives include, but are not limited to, voice operated components and touch screens. The terminal credit card reader 25 is shown as a standard magnetic card reader, although a programmable or non-magnetic card reader could be substituted and is within the purview of the invention.

The registration terminal 20 includes a housing 12 designed to allow the registration terminal 20 to be a stand alone unit that may be placed in a convenient location, such as in a drive up registration booth so as to allow a potential guest to receive registration data without leaving his or her vehicle. Alternatively, the registration terminal 20 could be placed in a walk up booth, or a terminal in the lobby of the place of lodging. For the purposes of this invention, a place of lodging should be understood to include, but not be limited to, a hotel, motel, boarding house, lodging house, bed-and-breakfast, or the like. Accordingly, when these terms are used herein, it should be understood that the terms are interchangeable.

Figure 2:
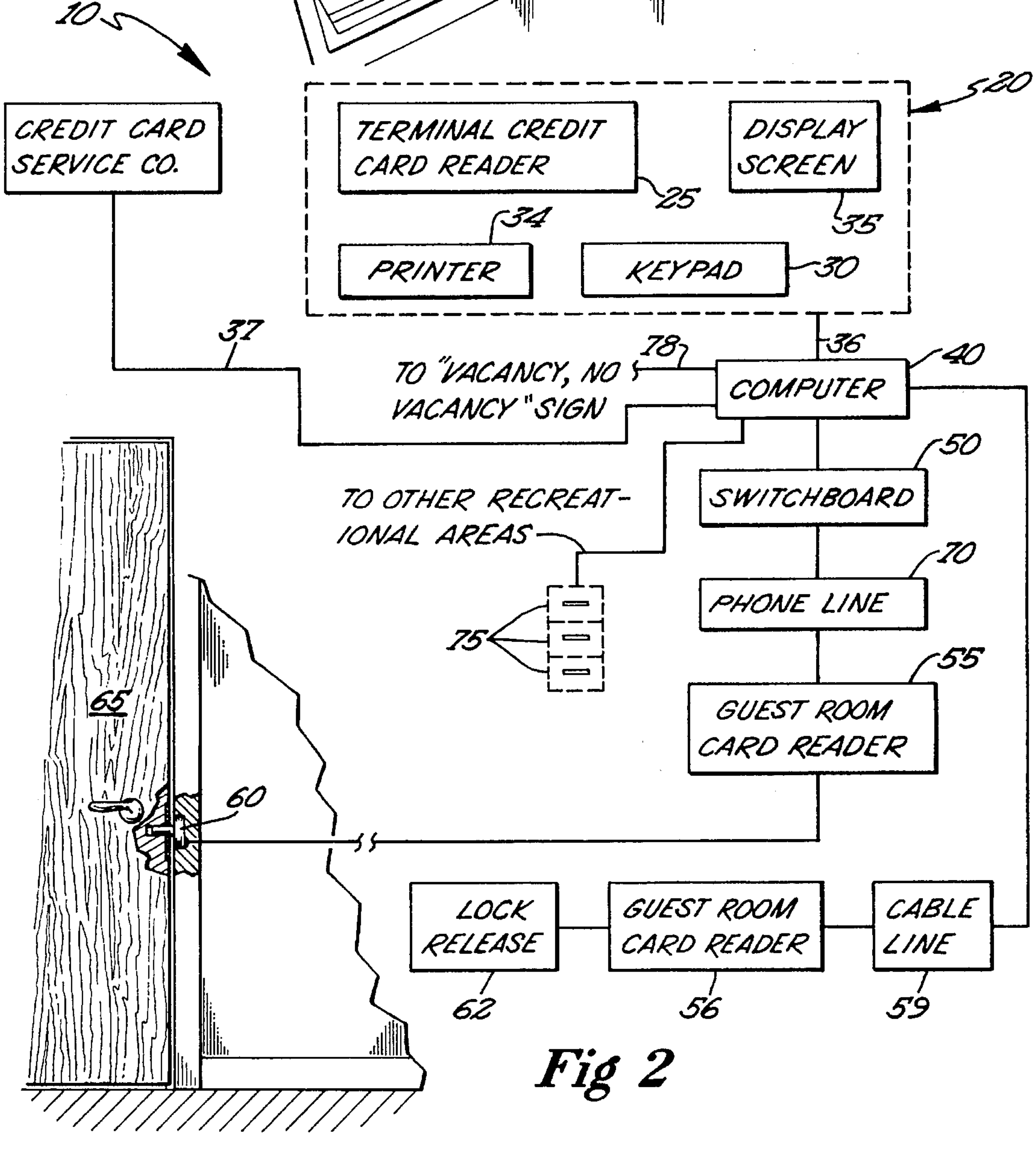
FIG. 2 is a block diagram of a guest registration system embodying the invention.

As is represented in the block diagram of FIG. 2, the terminal credit card reader 25, keypad 30, and display screen 35 and printer 34 are all operatively connected by connection cable 36 to a computer 40. The connection is preferably electrical, but other forms known or hereafter developed of information transmitting means are acceptable. The computer 40 may be an existing computer or a computer system already located at the place of lodging, or it may be provided as part of the guest registration apparatus 10. The registration computer 40 is connectable by modem with telephone switchboard 50 in known fashion to allow communication with a credit card service company for verifying credit information for the general purpose credit card 26 carried by the potential guest. For purposes of this invention, the term, general purpose credit card, should be interpreted to be any credit card issued by a bank, other financial institution, or general credit card service company, as opposed to a specialized card issued by a specific place of lodging, and includes but is not limited to cards issued under trademarks such as Master Card, Visa, Discover, or American Express. The computer 40 is provided with guest registration software suitable for controlling the information storage, retrieval, and informational operations of the guest registration system 10.

The registration system 10 also utilizes a plurality of guest room credit card readers, here illustrated as readers 55 and 56 and a plurality of door lock release apparatuses 60 and 62, connected through readers 55 and 56, respectively, to the computer 40. A room card reader such as reader 55 is positioned adjacent each guest room door. The card reader 55 may be connected to the computer 40 by utilizing existing telephone wiring 70 already in place between the computer 40 and individual guest rooms. Typically a modem phone wire contains at least 4 and sometimes more individual wire strands, some of which are not used unless main telephone wire leads break or fail. Certain of these unused extra wires may be used to convey electrical signals between the computer 40 and card readers such as unit 55. Similarly there may be circumstances where the signals from computer 40 may be delivered to a guest room card reader 56 through cable television lines 59, coding them in ways which will not interfere with conventional cable signals. Use of the telephone wire 70 or cable lines 59 will in some instances avoid the need for new wiring between the computer 40 and guest room card readers 55 and 56 and thereby reduce installation cost. The line 59 identified as a cable line, should, however, be understood to represent either cable television lines or conventional computer cable connections. Similarly standard wiring used to carry 110 or 220 volt power throughout the place of lodging may also serve as a medium on which signals may be conveyed using appropriate coding. Any such electrical wiring system, including telephone wires, cable television lines, house current wiring, intercoms and the like may be utilized with the invention as a conduit for the relaying of signals thereon between computer and guest room. Although only two card readers have been shown herein as illustrative of the invention, it should be understood that a larger number would be used in a typical hotel installation, connected in like fashion, and is within the purview of the invention.

The computer 40 will actuate the room door lock release apparatus 60 of the associated guest room when the computer recognizes that the proper credit card 26 has been inserted into the room card reader 55. The door lock release apparatus 60 is preferably a solenoid equipped strike plate replacing the strike plate of the original lock, but any other transducer capable of unlocking the door in response to insertion of the guest credit card is useable and within the purview of the invention. Upon check-out from the place of lodging, the computer 40 simply removes the credit card identity information from memory and the card 26 ceases to function as a guest room key. There is no need for registration information to be overwritten on the magnetic strip of the credit card 26, since none has been written on the credit card 26 in the first place.

It should be understood that guest credit cards 26 could also be magnetically encoded with various pertinent guest information by the use of a special encoder located at the front desk of the place of lodging, but this is not the preferred practice. Ample memory exists on the magnetic strip of most credit cards to allow them to be encoded with information which would in itself be the code to actuate a card reader. Encoding such information directly onto the magnetic strip of the credit card 26 has certain shortcomings, however, and is not desirable. If the card 26 is lost, stolen, or replaced, the entity issuing the card can not recede the place of lodging information onto a new card. Additionally, if room entry information encoded on the card 26 is not deleted in a timely manner, the card 26 will remain valid as a hotel key beyond the term of the room rental and becomes a potential security risk to the hotel and its future guests. Although information encoded onto the card 26 could be overwritten at the time of the next hotel registration, such overwriting or deletion may never occur when a guest is not a frequent customer, or the next hotel is not part of the same chain. In practice it seems likely that the information encoded onto the card 26 will not be overwritten unless and until the same credit card is used to register at another hotel, and only if that hotel uses an encoding system like the one used at the previous hotel, and only if the information is encoded in the same space of the magnetic strip of the card as in the previous hotel. Accordingly a magnetically encoded card still requires handling by staff at both the time of registration and departure, and such a card does not appreciably reduce the processing work required of the staff.

The hotel's switchboard 50 may also be connected with the registration terminal 20, or with the hotel computer 40 to allow a guest to pre-register at the place of lodging by telephone and to allow the computer 40 to bill long distance guest telephone calls to the credit card 26.

The computer 40 may also allow the guest credit card 26 to trigger actuation of door lock release apparatuses at entrances to other parts of the place of lodging, such as recreational areas, the pool, the exercise room, or the laundry room. This would allow access to those areas when the credit card 26 is inserted into one of several card readers 75, located adjacent the entrances to the place of lodging's recreational areas, in the fashion described above.

Figure 3:
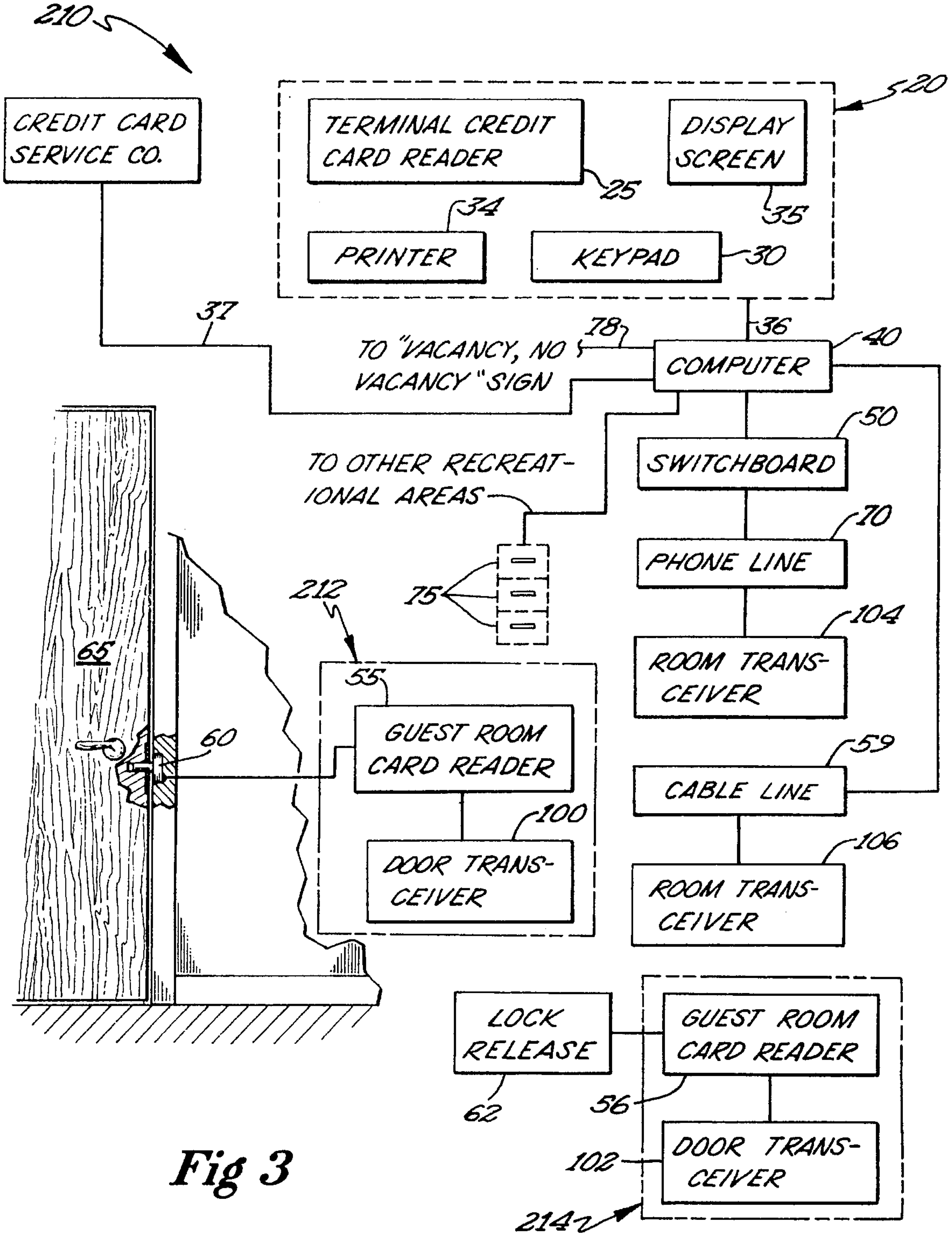
FIG. 3 is a block diagram of a wireless transmission embodiment of the guest registration system having transmitters and receivers within a guest room.

Referring now to FIG. 3, a wireless transmission embodiment 210 of the guest registration system may be seen. Such an embodiment eliminates the need to rewire or invade many difficult-to-access areas of the place of lodging, such as the existing walls, floors and ceilings of the guest rooms.

Referring now to FIG. 3, a first wireless communication means, here shown as guest room transceiver 104 or 106 is electrically connected by phone line 70 or cable line 59, respectively, or by other in-place electrical wiring to computer 40. The electrical wiring utilized may be any in-place system such as telephone lines, television antenna or cable lines, intercom or A. C. wires. Since room transceivers 104 and 106 are identical, only transceiver 104 will be described in detail below. The transceivers are of a power level to adequately transmit short distances to reach the guest room door receivers 100 and 102 described below.

A second wireless communication means, here shown as door transceiver 100 or 102 is electrically connected to an associated guest room card reader 55 or 56, respectively. The reader 55 or 56 is positioned on or adjacent the guest room door and accessible to a guest outside the door. Room transceiver 104 communicates wirelessly with door transceiver 100. Similarly room transceiver 106 communicates wirelessly with door transceiver 102. Door transceivers 100 and 102 are identical in nature, and accordingly only door transceiver 100 will be described in detail. It should be understood, however, that in most installations there will be a separate room transceiver and associated door transceiver allocated to each guest room.

The door receiver 100 and its associated guest room card reader 55 constitute a door control unit 212 which is electrically connected to a lock release apparatus 60. Similarly guest room card reader 56 and its associated door transceiver 102 collectively constitute a second door control unit 214 which is electrically connected to lock release apparatus 62. Since the door control units 212 and 214 are identical only the unit 2 12 will be described further hereafter.

In some cases the door transceiver 100 positioned at the guest room door need only be a wireless receiver and the room transceiver 104 need only be a transmitter. In such a case, credit card identity information would be delivered to the transmitter 104 from the computer 40 along telephone line 70. This information would then be transmitted by transmitter 104 and received by wireless receiver 100. The receiver 100 then delivers its received card identity information over electrical wires to its associated guest room card reader 55. The card reader 55 can include a memory element in which the card identity information is stored and against which the card reader 55 would compare each card it reads. When a card is read which matches the stored credit card identity information, the reader 55 would actuate the lock release 60 to allow the matching card to be accepted as a room key.

While the memory element may be located in the card reader 55, it should be understood that such memory can also be a separate element of the door control unit 212 on a part of the door transceiver 100, and all such variations are within the purview of the invention. The door control unit 212 will actuate the lock release 60 when a credit card read by card reader 55 matches the card identity information supplied to the door control unit 212 from the computer 40.

Under some circumstances, the door transceiver 100 and the room transceiver 104 may both be transceivers capable of both transmitting and receiving wireless signals. This arrangement is important when the components of door control unit 212 have no memory element. In such an arrangement, when a guest inserts his credit card within the guest room card reader 55 in order to open the door and gain access to his room, the card reader 55 first reads the offered card and obtains the card identity information therefrom. This card identity information is then delivered over electrical wiring to the door transceiver 100, and the transceiver 100 transmits the card identity information wirelessly to the room transceiver 104. The transceiver 104, on receiving the transmitted card identity information will deliver that information to the computer 40 along phone line 70. The computer 40, after receiving the card identity information, will compare that information with its memory to determine whether the card belongs to an approved guest.

When the computer confirms that the card is an approved card, the computer 40 sends a signal along the telephone line 70 back to room transceiver 104. The room transceiver 104 wirelessly transmits this signal to the door transceiver 100 of door control unit 212. When the door unit 212 receives the signal, that signal will be used by either reader 55 or receiver 100 to actuate the lock release apparatus 60 to unlock the guest room door. If the credit card identity information matches no card in computer memory, the guest room door remains locked.

With the described wireless communication means, the room transceiver (or transmitter) 104 is preferably positioned within the guest room at a convenient location and is hard wired directly to the computer 40 over the described electrical wiring serving the guest room. This location may be chosen for the convenience of the installer, and may be concealed within the room or it may be adjacent the connection point for the wiring used to carry signals from the room transceiver 104 to the computer 40. The placement of the connection point within the room also makes it less accessible to those outside the room seeking unlawful entry to the room.

The door transceiver (or receiver) 100 is preferably positioned immediately adjacent the guest room card reader 55 within the guest room or can even be included as a subassembly within the card reader housing, both alternatives being within the purview of the invention. Since it is necessary to have a hard wired connection between the transceiver 100 and the card reader 55, it is desirable to place the two in as close proximity as physically possible in the guest room.

By utilizing the wireless communication units 100 and 104, the need to run wires all the way from computer 40 to the guest room card reader 55 is eliminated. In particular, the need to disrupt an attractively finished guest room by tearing up carpeting, removing molding or cutting or drilling associated with new wiring is reduced or eliminated.

While the embodiment 2 10 has been described as utilizing a transceiver (or transmitter) 104 in each guest room, it should be understood that in some hotel installations it may be desirable to instead have only a single master transceiver (or transmitter) centrally located in the hotel, and to use such master transceiver to broadcast at multiple distinct frequencies associated with each room transceiver (or receiver) 100. Alternatively, a single frequency might be utilized and coded to associate with and control the transceivers 100 in individual guest rooms.

Although the wireless communication means 100 and 104 described herein preferably utilize wireless radio frequency signals, it should be understood that other wireless means such as infrared light and sound waves are within the purview of the invention and where suitable may be utilized. The term "radio frequency" is intended to cover any wireless radio frequency useable for communication purposes and is not limited to frequencies associated with commercial radio transmissions.

Figures 4, 5:
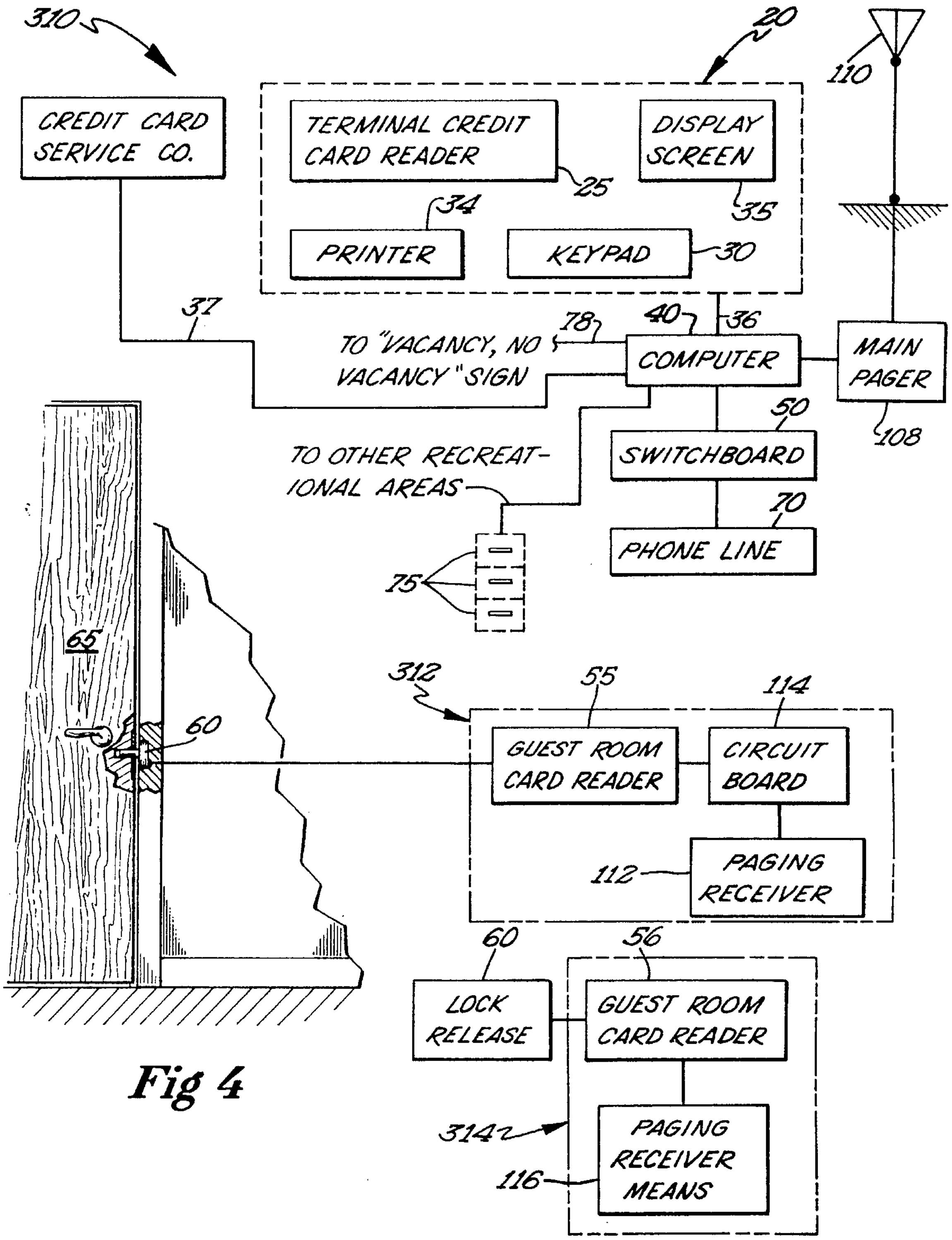
FIG. 4 is a block diagram of a wireless transmission embodiment of the guest registration system having direct wireless communication between a hotel central computer and the guest room card reader.
FIG. 5 is a block diagram of an alternative door control unit which may be used with the embodiment of FIG. 4.

Referring now to FIG. 4, a further embodiment 310 of the hotel registration apparatus is shown. In FIG. 4, the components which am common with the earlier described embodiments are labeled and numbered with the same numbers used for the earlier embodiments. New components and connections are described hereafter. The embodiment 310 utilizes commercially available pager technology in providing the wireless communication between computer 40 and guest room card reader 55.

A main paging transmitter 108 is electrically connected to the computer 40 and defines a first wireless communication means to allow card identity information to be sent to a second wireless communication means here shown as paging receiver 112. As used herein, the term main paging transmitter includes a transmitter unit large enough to transmit from the unit's location to any guest room of the place of lodging and utilizes pager technology of the type which transmits phone numbers and messages to portable pagers of the type now in wide commercial use. However, instead of transmitting and receiving phone numbers, the unit would transmit credit card identity information to paging receivers, with one such receiver positioned in each guest room. A transmitter antenna 110 connected to the main paging transmitter 108, is preferably mounted on top of the hotel structure to be serviced by the wireless paging system, to increase the range and effectiveness of the transmitter. The paging transmitter may be located on hotel premises or may be a remotely located transmitter positioned elsewhere and accessed by the hotel computer over wires, cables, or telephone lines.

A standard, commercially available paging receiver 112 defines a paging receiver means and is placed adjacent the guest room door, as for example, on the wall beside such door, or within the strike plate or even on or in the door of the guest room, and delivers information to the room card reader 55. Electrically connected with the paging receiver 112 is a circuit board 114 which constitutes a paging memory means capable of interpreting and storing in memory information signals containing credit card identity information received by the paging receiver 112, so that when a guest inserts credit card 26 into the guest room card reader 55, the circuit board 114 compares the credit card identity information with that of the credit card and determines whether the lock release 60 should be actuated. The room card reader 55, paging receiver 112 and circuit board 114 collectively constitute a door control unit 312.

The main paging transmitter 108 receives card identity information from the computer 40. The computer 40 has gathered this information from the guest and the guest credit card 26 at check-in, as described above. Once the computer 40 has assigned the guest a room it sends the proper information, such as credit card number and room number, to the main pager transmitter 108, which in turn pages the paging receiver 112 of the proper room with the information. The circuit board 114, located in the guest room door control unit 312 stores the received information, and when the guest runs his proper credit card 26 through the guest room card reader 55 the door lock release apparatus 60 is actuated, and the room door opens. Circuit board 114 will typically include circuitry to receive and store in memory the credit card identity information of the card authorized to open a specific guest room. In addition the circuitry will be connected with the room card reader 55 to receive card identity information relating to each card read by reader 55. The circuit board 114 will then compare the offered card's information with the authorized card information, and if a match occurs will signal the card reader 55 or lock release apparatus 60 to open the guest room door.

Referring now to FIG. 5, an alternative door control unit 314 is shown and includes card reader 56 and a paging receiver means 116. The door control unit 314 may be used in place of the unit 312 shown in FIG. 4. Paging receiver means 116 comprises an integral paging receiver and associated circuitry which is capable of receiving a card identity information signal transmitted from paging transmitter 108, interpreting and storing the information received, and communicating with the guest room card reader 56 when the guest runs a proper credit card 26 through card reader 56. The circuitry of paging receiving means 116 will allow quick and easy comparison of information received from the main paging receiver 108 and the credit card 26 of the guest. If the proper credit card 26 has been run through the proper guest room card reader 56, the comparison will be positive, and the associated circuitry will send appropriate instructions to actuate the lock release apparatus 60 at the guest room.

Since the communications from the main paging transmitter 108 are wireless, there will be no need to add to existing wiring within the guest room. The power source for the paging receivers located at the guest room door will preferably be batteries. Alternatively, the paging receivers at the guest room doors may be connected through appropriate transformers and rectifiers to standard electric service lines serving the place of lodging.

In operation, a guest arriving at the registration terminal 20 inserts his general purpose credit card 26 into the terminal credit card reader 25. The terminal credit card reader 25 reads the card identity information encoded on the credit card 26, and conveys that information and other guest information obtained by the terminal to the computer 40, and hence to the guest registration software. The terns, guest data should be interpreted to include inter alia, the guest name, address, credit card service company, account number, and the like and also preferences of the guest including such things as room size, bed size, number of guests, smoking preference and term of stay. Once the credit status of the card 26 has been verified in known fashion, the computer 40 prompts the display screen 35 to execute a series of prompts to the guest. These prompts may include such things as asking for a personal identification number to be used for extra security, room occupancy need (such as single or double and number of guests), smoking preference, and expected length of stay. The guest uses keypad 30 to provide answers to the prompts. Any number of other prompts may be programmed into the software. For example, the guest may also be prompted by a display on the display screen 35 to enter on the keypad 30 a time to be awakened. The computer 40 stores all such guest data and card information obtained as a result of these prompts at least until the guest checks out.

The computer 40 next calculates the expected charges for the stay, assigns a guest room to the guest based on the answers to the prompts, and uses the display screen 35 to display the room assignment and location and expected charges, as well as having the display screen 35 inform the guest that the guest credit card 26 will serve as the key to the assigned room. In addition, the printer 34 may be actuated to provide both a receipt and written instructions describing the assigned room, its location and the fact of the guest credit card being the room key. Once a guest has registered using the credit card 26, the computer 40 stores the credit card identity information. When a credit card 26 is inserted into a room magnetic card reader 55, the room magnetic card reader 55 transmits to computer 40 in various described ways the credit card identity information. The computer 40 determines whether the proper credit card 26 has been inserted into the proper guest room card reader 55. If so, the computer 40 causes the door lock release apparatus 60 at the assigned guest room to be actuated. If an improper card is inserted into the room card reader 55, computer 40 will not actuate door lock release apparatus 60. In an alternative embodiment, the guest room card reader 55 could retain in memory the credit card information transmitted to it by computer 40 and be programmable to actuate the door lock release apparatus 60 on recognition of the card 26 without the need for further communication with the computer 40. All of these steps are accomplished without interfacing with hotel employees.

The guest's personal credit card 26 thus becomes his room key and it also may become a key to other areas of the place of lodging. It may also be used to charge long distance telephone calls, to order room service, or to obtain service at the hotel restaurant. Upon check-out, the registration computer 40 simply de-activates the guest information, eliminating the problem of illicit duplication of metal keys or punch-coded cards. Alternatively, only the credit card key usage authorization could be de-activated, leaving the other guest information to be stored for future stays by the same guest. In this way, hotel security is increased. Security is also increased by having the guest's credit card 26 be the room key since the guest is much more likely to closely guard his or her credit card 26, which has personal value, as opposed to a hotel key, with little personal value.

The guest registration system 10 eliminates the need for hotel staff to continuously man the front desk and automatically generates billing information through the use of the computer 40, allowing the guest to check out of the hotel using the system 10. Since the guest registration system 10 has all of the credit card identity information, the disclosed invention constitutes a complete system of guest registration. When the guest wishes to check out, it is a simple matter to go to the registration terminal 20, run the credit card 26 through the terminal credit card reader 25, and indicate by use of the keypad 30 the desire to check out. The computer 40 calculates a bill based on the number of nights stayed and the room occupancy, long distance calls, and other charges accrued to the credit card 26, and can bill the credit card 26 directly for those services and print and dispense an appropriate final receipt or statement. Alternatively, the registration terminal 20 can print a bill to be paid at the front desk of the hotel during regular staff hours. In the event the guest does not check out, the system deactivates his key card authorization at the end of his indicated tenancy and bills his charges to the credit card account.

With minor adaptations well within the ability of those skilled in the art, the guest registration system 10 can be customized to the place of lodging at which it will be used. Further additions to the services provided by the guest registration system 10 might include operating a "Vacancy/No Vacancy" sign 78 at the place of lodging depending upon whether a room is available, and other additions that those skilled in the art would readily discern.

The detailed description outlined above is considered to be illustrative only of the principles of the invention. Numerous changes and modifications will occur to those skilled in the art, and there is no intention to restrict the scope of the invention to the detailed description. The preferred embodiment of the invention having been described in detail, the scope of the invention will be defined by the following claims.

What is claimed is:

1. A guest registration apparatus for use at a place of lodging having a computer and at least one guest room with a door and lock, by a guest with a general purpose credit card validated by a credit card service company and without altering the card by entering any information on the card, said guest registration apparatus comprising:

- a registration terminal accessible to the guest, said terminal including:
  - a terminal credit card reader capable of reading the general purpose credit card to obtain card identity information;
  - data input means for receiving data from the guest;
  - data conveying means for delivering data to the guest; and
  - means to convey said card identity information and data received at said registration terminal to the computer;
- a main paging transmitter, electrically connectable to the computer to receive said card identity information from the computer and to wirelessly transmit an information signal containing said card identity information to the guest room;
- a guest room door control unit, including:
  - a guest room general purpose credit card reader positionable adjacent the guest room door to read the unaltered general purpose credit card of the guest so as to obtain unaltered card identity information so as to use such card as a room key;
  - paging receiver means for receiving said information signal from said main paging transmitter by wireless communication therewith, said paging receiver means electrically connected to said room card reader and including a paging receiver and paging memory means to store said information signal received from said main paging transmitter, said paging memory means also receiving unaltered card identity information from said room card reader and comparing said card information with said room card identity information from said paging transmitter; and
- a guest room door lock release apparatus electrically connected to said door control unit and positionable to actuate the lock at the guest room door upon being actuated by said door control unit.

2. A guest registration apparatus for use at a place of lodging having a computer and at least one guest room with a door and lock, by a guest with a credit card, said guest registration apparatus comprising:

- a registration terminal including:
  - a terminal card reader capable of reading the credit card to obtain card identity information;
  - data input means for receiving data descriptive of the guest;
  - data conveying means for delivering data needed by the guest;
- means to convey said card identity information and data received at said registration terminal to the computer;
- a main paging transmitter, electrically connectable to the computer to receive said card identity information from the computer and to wirelessly transmit an information signal containing said card identity information to the guest room;
- a guest room door control unit, including:
  - a guest room credit card reader positionable adjacent the guest room door to read the credit card of the guest so as to obtain card identity information so as to use such card as a room key;
  - paging receiver means for receiving said information signal from said main paging transmitter by wireless communication therewith, said paging receiver means electrically connected to said room card reader to store said information signal received from said main paging transmitter, to receive card identity information from said room card reader, and to compare said card information with said room card identity information from said paging transmitter; and
- a guest room door lock release apparatus electrically connected to said door control unit and positionable to actuate the lock at the guest room door upon being actuated by said door control unit.

3. The guest registration apparatus of claim 2, wherein said paging receiver means comprises:

- a paging receiver for receiving said information signal from said main paging transmitter; and
- paging memory means, electrically connected to said paging receiver, to store said information signal received by said paging receiver from said main paging transmitter, to receive said card identity information from said room card reader and to compare said card identity information with said card identity information from said main paging transmitter.

4. The guest registration apparatus of claim 2, wherein said registration terminal is positioned to be accessible to the guest.

* * * * *